(12) United States Patent
Kappelman

(10) Patent No.: US 11,140,831 B2
(45) Date of Patent: Oct. 12, 2021

(54) WRAP MATERIAL SUPPLY SYSTEMS FOR USAGE IN AGRICULTURAL BALING MACHINES

(71) Applicant: Deere & Company, Moline, IL (US)

(72) Inventor: Jacob D. Kappelman, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 156 days.

(21) Appl. No.: 16/352,146

(22) Filed: Mar. 13, 2019

(65) Prior Publication Data
US 2020/0288639 A1     Sep. 17, 2020

(51) Int. Cl.
*A01F 15/07* (2006.01)

(52) U.S. Cl.
CPC .... *A01F 15/0715* (2013.01); *A01F 2015/072* (2013.01)

(58) Field of Classification Search
CPC ............... A01F 15/071; A01F 15/0715; A01F 2015/072; B65B 41/16; B65B 27/125
USPC ............................ 53/399, 582, 389.3–389.5
See application file for complete search history.

(56) References Cited

U.S. PATENT DOCUMENTS

| | | | |
|---|---|---|---|
| 4,324,552 A * | 4/1982 | Boushek, Jr. | .......... A01D 69/00 474/118 |
| 4,768,431 A * | 9/1988 | Merritt, III | ......... A01F 15/0715 100/15 |
| 4,896,477 A * | 1/1990 | Wagstaff | ............. A01F 15/0715 53/118 |
| 4,956,960 A * | 9/1990 | Anstey | ................ A01F 15/0715 100/5 |
| 5,104,714 A | 4/1992 | Leiber et al. | |
| 5,216,873 A * | 6/1993 | Ratzlaff | ............. A01F 15/0715 53/118 |
| 5,311,729 A | 5/1994 | Viaud | |

(Continued)

FOREIGN PATENT DOCUMENTS

EP          0293025 A1    11/1988
WO     WO2010089641 A1    8/2010

OTHER PUBLICATIONS

Applicant, Deere & Company, Utility U.S. Appl. No. 15/917,242, filed Mar. 9, 2018, Material Wrap System With Automatic Drive Tension Compensation.

(Continued)

*Primary Examiner* — Joshua G Kotis
(74) *Attorney, Agent, or Firm* — Klintworth & Rozenblat IP LLP

(57) ABSTRACT

Wrap material supply systems for delivering wrap material from a wrap material roll for application around crop bales include a baler housing containing a baling chamber, a drive roll rotatably mounted to the baler housing, and a pivoting frame coupled to the baler housing at a first pivot point. A feed roll is rotatably mounted to the pivoting frame and positioned to engage the wrap material roll. The wrap material supply system further includes a drive belt, which, when tensioned, transmits rotation from the drive roll to the feed roll. An actuator is controllable to rotate the pivoting frame about the first pivot point to move the feed roll relative to the drive roll, tension the drive belt, and initiate feeding of the wrap material from the wrap material roll into the baling chamber.

16 Claims, 8 Drawing Sheets

(56) References Cited

U.S. PATENT DOCUMENTS

| | | |
|---|---|---|
| 6,006,504 A | 12/1999 | Myers et al. |
| 6,272,816 B1 | 8/2001 | Viaud et al. |
| 7,278,251 B2 * | 10/2007 | Paillet ................. A01F 15/0715 242/563.2 |
| 2007/0157556 A1 * | 7/2007 | Feraboli .............. A01F 15/0715 53/399 |
| 2007/0169441 A1 | 7/2007 | Viaud |
| 2010/0192516 A1 * | 8/2010 | Olander .............. A01F 15/0715 53/399 |
| 2017/0049058 A1 | 2/2017 | Eubanks et al. |

OTHER PUBLICATIONS

Applicant, Deere & Company, Utility U.S. Appl. No. 15/922,573, filed Mar. 15, 2018, Material Wrap System With Self Cleaning Feature.

European Search Report issued in counterpart application No. 20161808.9 dated Sep. 7, 2020 (08 pages).

* cited by examiner

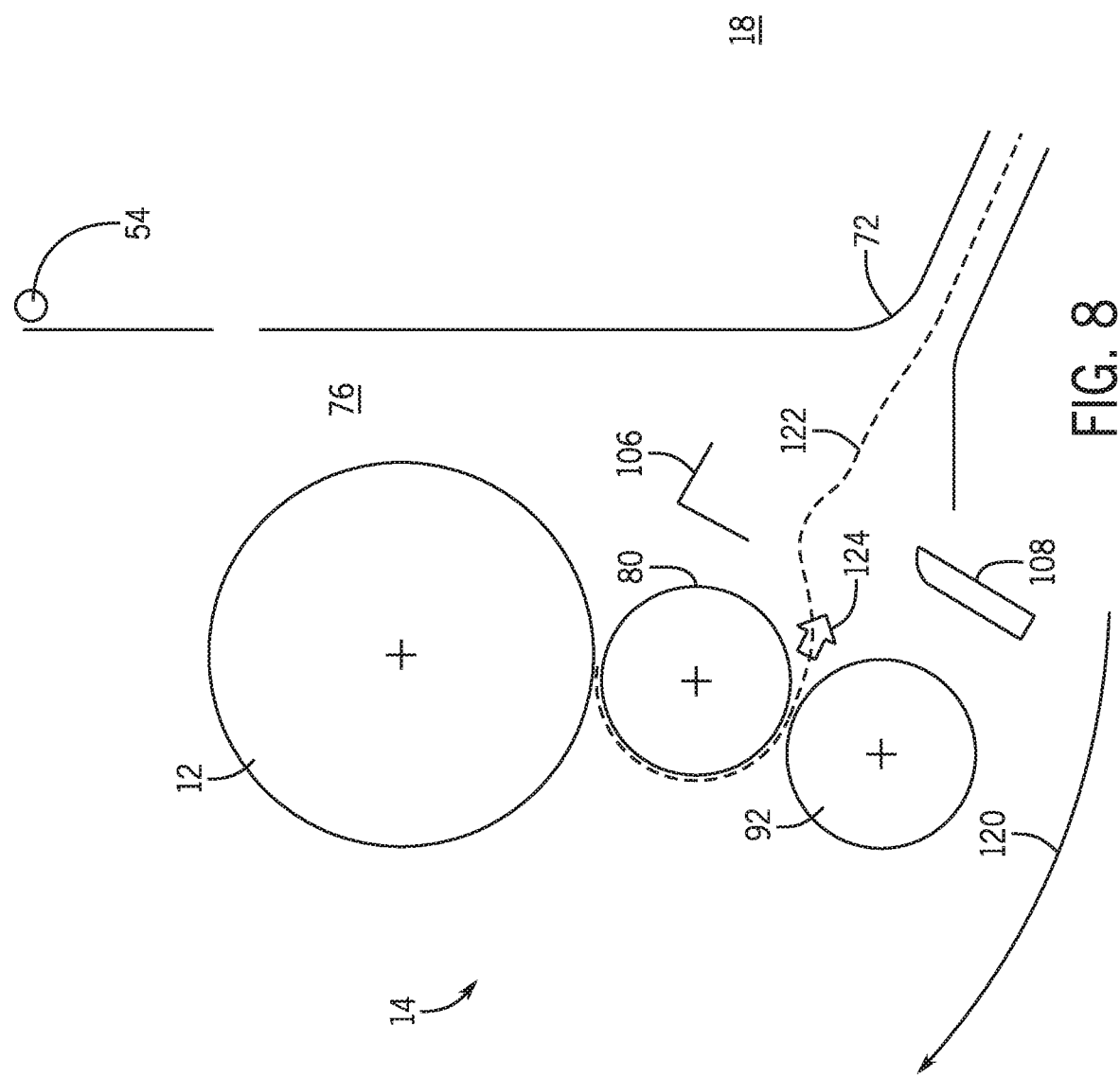

WRAP MATERIAL SUPPLY SYSTEMS FOR USAGE IN AGRICULTURAL BALING MACHINES

STATEMENT OF FEDERALLY SPONSORED RESEARCH OR DEVELOPMENT

Not applicable.

CROSS-REFERENCE TO RELATED APPLICATION(S)

Not applicable.

FIELD OF THE DISCLOSURE

This disclosure relates to wrap material supply systems for applying wrap material around crop bales, and, more specifically, to wrap material supply systems included in agricultural baling machines.

BACKGROUND OF THE DISCLOSURE

The ease and efficiency with which certain crops are harvested, packaged, and transported have been greatly improved through the introduction of agricultural baling machines or, more simply, "balers." A conventional round baler, for example, intakes a harvested crop, such as hay, as the baler is towed or otherwise moved across a field. Within a baling chamber of the baler, the harvested crop is rolled into a round bale by a system of bale-forming belts. After reaching a desired size, the round crop bale is ejected from the baling chamber to ready the baler for formation of the next crop bale. Prior to ejection of the newly-formed crop bale, a wrap material supply system applies a suitable wrap material, such as a stretchable film or mesh, around the outer periphery of the crop bale. Depending upon the width of the wrap material relative to the dimensions of the crop bale, the wrap material may also extend over and partially cover the ends of the crop bale. When properly stretched about the outer periphery of a crop bale, the wrap material exerts an inward circumferential force on the bale to maintain the baled crop in a relatively dense, tightly packed state. This facilitates transport and improves the weather-ability of the wrapped crop bale; that is, the ability of the crop bale to resist water ingress and withstand weather exposure without excessive spoilage of the baled crop. Wrapping crop bales in this manner thus provides improved in-field preservation of the baled crop or "crop packages" until it becomes possible to transport the crop packages at a later point in time.

SUMMARY OF THE DISCLOSURE

Wrap material supply systems for delivering wrap material from a wrap material roll for application around crop bales are provided. In embodiments, the wrap material supply system includes a baler housing containing a baling chamber, a drive roll rotatably mounted to the baler housing, and a pivoting frame coupled to the baler housing at a first pivot point. A feed roll is rotatably mounted to the pivoting frame and positioned to engage the wrap material roll. The wrap material supply system further includes a drive belt, which, when tensioned, transmits rotation from the drive roll to the feed roll. An actuator is mechanically linked to the pivoting frame and is controllable to rotate the pivoting frame about the first pivot point to move the feed roll relative to the drive roll, tension the drive belt, and initiate feeding of the wrap material from the wrap material roll into the baling chamber.

Wrap material supply systems are provided for applying wrap material from a wrap material roll around crop bales formed within agricultural baling machines or "balers." In various embodiments, the wrap material supply system includes a baler housing containing a baling chamber, a drive roll rotatably mounted to the baler housing, and a pivoting frame coupled to the baler housing at a first pivot point. A feed roll is rotatably mounted to the pivoting frame and positioned to engage the wrap material roll when loaded into the wrap material supply system. The wrap material supply system further includes a drive belt extending around the drive roll and the feed roll. When tensioned, the drive belt transmits rotation from the drive roll to the feed roll. An actuator is mechanically linked to the pivoting frame and is controllable to rotate the pivoting frame about the first pivot point to move the feed roll relative to the drive roll in a manner tensioning the drive belt and initiating feeding of the wrap material from the wrap material roll into the baling chamber.

In further embodiments, the wrap material supply system contains a drive roll, which is rotationally driven during system operation. A feed roll is positioned to engage the wrap material roll when loaded into the wrap material supply system, and a drive belt transmits rotation from the drive roll to the feed roll when the drive belt is tensioned. The wrap material supply system further includes a counter knife arm, which is rotatable relative to the feed roll. An actuator having an actuator output is mechanically linked to the counter knife arm. The actuator output is movable from a first end position, through an intermediate position, and to a second end position. The counter knife arm rotates as the actuator output moves from the first end position into the intermediate position, while the drive belt remains in a slack state in which the drive roll and the feed roll are rotationally decoupled. As the actuator output moves from the intermediate position into the second end position, the drive belt is tensioned to initiate feeding of the wrap material from the wrap material roll into a baling chamber.

In still further embodiments, the wrap material supply system includes a baler housing, a pivoting frame coupled to the baler housing at a first pivot point, an actuator coupled between the baler housing and the pivoting frame, and a material-contacting roll assembly supported by the pivoting frame. The baler housing contains a baling chamber and a feed opening through which the wrap material is delivered into the baling chamber. The actuator is controllable to rotate the pivoting frame about the first pivoting point between a home position and a pivoted position. When rotationally driven, the material-contacting roll assembly delivers the wrap material from the wrap material roll and into the feed opening. The wrap material is imparted with a wrap material output trajectory when discharged from the material-contacting roll assembly, with the wrap material output trajectory tilted towards the feed opening when the pivoting frame rotates from the home position into the pivoted position.

The details of one or more embodiments are set forth in the accompanying drawings and the description below. Other features and advantages will become apparent from the description, the drawings, and the claims.

BRIEF DESCRIPTION OF THE DRAWINGS

FIG. 8 is a schematic of the wrap material supply system (selected components shown), as depicted in a second end (wrap-feed) position to further illustrate one manner in which rotation of the pivoting frame may tilt the wrap material output trajectory of the supply system toward a feed opening of a baling chamber to decrease the likelihood of wrap material misfeeds.

Figure 1:
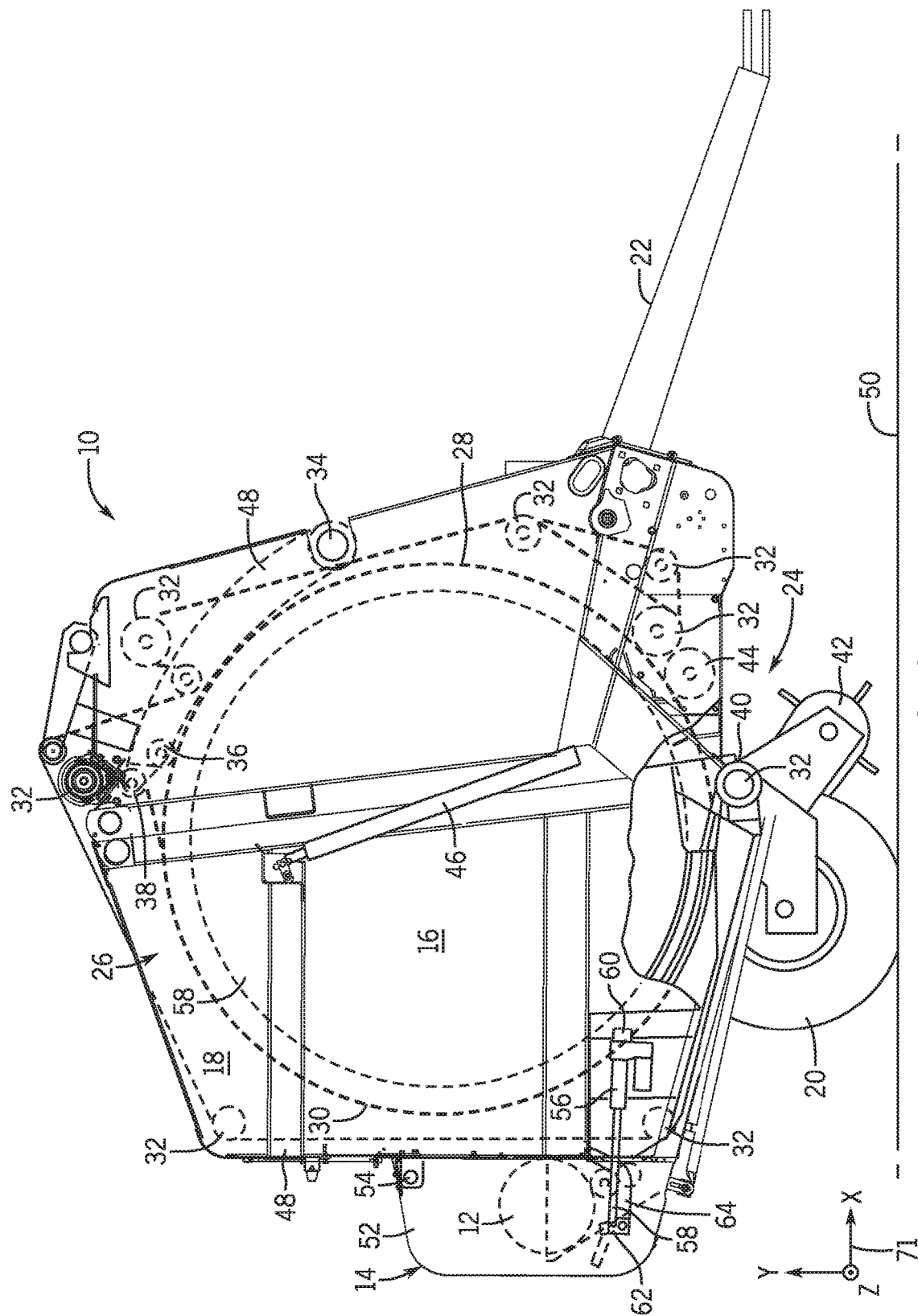
FIG. 1 is a schematic of an agricultural baling machine (here, a round baler) including a wrap material supply system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing herein, the term "wrap material" is defined to broadly encompass any material amenable to application around crop bales by a wrap material supply system included in a round baler or other agricultural baling machine. The selected wrap material will often have a relatively thin sheet-like form factor, whether provided as a continuous sheet, a netting, or a mesh. Examples of suitable wrap materials, including knit ribbons of thermoplastic materials, can be found in the following document, which is incorporated by reference: U.S. Pat. No. 5,104,714, entitled "ELASTIC PLASTIC NETTING MADE OF ORIENTED STRANDS," and issued Apr. 14, 1992, by the United States Patent and Trademark Office.

OVERVIEW

As noted above, agricultural baling machines or "balers" are equipped with wrap material supply systems, which apply wrap material around crop bales for temporary in-field storage and transport. By common design, wrap material supply systems rely on idler-induce tensioning of a drive belt to initiate feeding of wrap material from a wrap material roll stored within a chamber. The idler utilized to tension the drive belt may assume the form of a freely-rotatable wheel, which is mounted to a rotatable counter knife arm. The idler engages into the drive belt in conjunction with rotation of the counter knife arm from a first (lowered) position to a second (raised) position. The counter knife arm also carries a counter knife angle, which is rotated into contact with a stationary knife when severing wrap material from the wrap material roll. Rotation of the counter knife arm is controlled utilizing an actuator, such as an electromechanical linear actuator having an extendible output shaft. During bale formation within a baling chamber of the baler, the actuator is commanded to maintain the output shaft in a fully retracted position. When the output shaft is fully retracted, the counter knife arm remains in a lowered position in which the counter knife angle rests against the stationary knife and the idler is physically disengaged from the drive belt. After a newly-formed bale reaches a desired size, the actuator is commanded to extend the output shaft. As the output shaft extends toward a fully extend position, the counter knife arm rotates in a manner lifting the counter knife angle from the stationary knife. Concurrently, the counter knife angle passes through the path traveled by the wrap material when delivered into the baling chamber. Wrap material is not conveyed into the baling chamber at this juncture, however, and passage of the counter knife angle through the wrap material path is typically non-problematic.

As the output shaft moves into the fully extended position, the counter knife arm rotates further to engage the idler into and thereby tension the drive belt. Now tensioned, the drive belt transmits rotation from the spinning drive roll to the feed roll, which contacts the wrap material roll. Wrap material is thus drawn from the wrap material roll and delivered into the baling chamber for application around the newly-formed crop bale. As the wrap material is applied about the crop bale, the wrap material is stretched due to a speed differential between the feed roll and bale-forming belts within the baling chamber. Following application of a desired amount of wrap material around the crop bale, the actuator is commanded to return the output shaft to its fully retracted position. In accordance with this command, the actuator begins retraction of the output shaft causing the counter knife arm to rotate in an opposing rotational direction and the idler to disengage from the drive belt. No longer tensioned by the idler, the drive belt returns to a slack state, again rotationally decoupling the feed roll from the spinning drive roll. Retraction of the output shaft may also result in application of a brake to the feed roll to arrest feed roll rotation in certain wrap material supply systems. As the output shaft retracts further toward the fully retracted position, the counter knife arm rotates to lower the counter knife angle onto the stationary knife. The drawn wrap material is pinched between the counter knife angle and the stationary knife, thereby severing the wrap material at a location between the wrapped crop bale and the wrap material roll. The wrapped crop bale may then be ejected from the baling chamber to ready the baler for formation of the next crop bale.

Wrap material supply systems of the type just described are generally effective at producing wrapped crop bales on a repeated basis under real-world operating conditions with a fair degree of reliability. This notwithstanding, conventional wrap material supply systems remain limited in certain respects, several of which relate to idler-based tensioning of the drive belt. For various reasons, it is desirable to allow the position of the idler on the counter knife arm to be adjustable; e.g., in one common design, the idler wheel may be movable within a slot formed in the counter knife arm. If positioned too close to the drive belt (e.g., if advanced too far forward in the slot), the idler may prematurely engage into the drive belt when the counter knife arm rotates into the raised position in conjunction with extension of the actuator output shaft. Premature engagement of the idler into the drive belt may hasten drive belt wear and increase the likelihood of wrap material misfeed. Conversely, if positioned too far from the drive belt on the counter knife arm, the idler may fail to adequately tension the drive belt when the counter knife arm rotates into the raised position. Drive belt under-tensioning may consequently occur resulting in loosely-wrapped, misshapen crop bales having poor weather-ability and an increased propensity toward spoilage. Generally, then, optimal operation of the wrap material supply system is highly reliant on the positioning of the idler wheel and undesirably prone to relatively minor variations in idler positioning. Further, as the position of the idler may gradually drift or change over time, an operator may be tasked with repeatedly inspecting and adjusting idler position over the lifespan of the baler. Finally, even when properly positioned on the counter knife arm, usage of an idler to tension the drive belt inevitably reduces belt life to some degree due to back-bending caused by engagement of the idler into the belt.

Conventional wrap material supply systems are limited in other respects, as well. For example, conventional wrap material supply systems may be undesirably sensitive to variations in actuator output force. If the actuator output force is relatively high, over-tensioning of the drive belt may occur, again resulting in the issues mentioned above related to drive belt wear and wrap material misfeed. Conversely, if the actuator output force is relatively low, under-tensioning of the drive belt may occur. As a further limitation, conventional wrap material supply systems are often characterized by an angular misalignment or disparity between the trajectory of the wrap material (as discharged from the feed roll and any other wrap material-contacting rolls) and the feed opening through which the wrap material is delivered into the baling chamber. This angular disparity is generally inconsequential under ideal operating conditions and slower wrap material delivery speeds. This angular misalignment can, however, increase the likelihood of wrap material misfeed in certain instances. For example, when delivered at a higher rate of speed, the wrap material may follow a pronounced sinusoidal path after discharge from the wrap material-contacting rolls toward the feed opening. Such undesired sinusoidal motion presents an opportunity for the wrap material to inadvertently impinge against neighboring structures, such as the raised counter knife angle, once again increasing the likelihood of a wrap material misfeed. Wrap material misfeeds not only result in wasted wrap material and added cost, but often necessitate baler shutdown increasing baler downtime and diminishing productivity.

There thus exists an ongoing industrial demand for enhanced wrap material supply systems overcoming many, if not all of the limitations associated with conventional wrap material supply systems. In satisfaction of this demand, the following provides enhanced wrap material supply systems for apply wrap material around crop bales in a highly reliable manner, with a decreased likelihood of wrap material misfeed, and with greater uniformity in wrap material application. In various embodiments, the enhanced wrap material supply system utilizes selective tensioning of a drive belt to rotationally couple and decouple a feed roll from a drive belt in a manner somewhat similar to that previously described. However, in contrast to conventional approaches, drive belt tensioning is accomplished, wholly or in principal part, by selectively increasing a distance or separation between a drive roll and a feed roll. Reliance on idler-based tensioning is consequently reduced, if not eliminated to mitigate the above-described issues relating to idler positioning, exacerbated belt wear, and wrap material misfeed. The overall reliability of the wrap material supply system is increased as a result, while the service life of the drive belt is prolonged. Concurrently, elimination of the idler (and, perhaps, other associated structure features present in conventional wrap material supply systems) ensures greater uniformity in tensioning the belt across iterations of the bale wrapping process to reduce or eliminate sensitivity to variations in actuator output force. As a still further advantage, embodiments of the wrap material supply system utilize a single actuator to drive the movements associated with wrap material feeding and cutting in a highly synchronized manner.

Distancing of the drive roll and the feed roll can be accomplished utilizing different approaches depending upon, for example, the manner in which the actuator is mechanically linked to the relevant movable components of the wrap material supply system. In implementations, distancing of the drive roll and the feed roll is accomplished through the pivoting action of a frame, which is joined to the baler housing at a first pivot point and which is selectively pivoted or tilted relative to the baler housing by an actuator. Specifically, through movement of the actuator output, such as extension of an output shaft when the actuator assumes the form of a linear actuator, the pivoting frame can be rotated from a first position (herein, the "home position") to a second position (herein, the "pivoted position") at appropriate junctures between the bale formation, wrap material feed, and wrap material cutting processes. Pivoting motion of the frame may tension the drive belt by moving feed roll away from the drive roll, which may be mounted to the pivoting frame and to the baler housing, respectively. In embodiments, such tensioning is accomplished without usage of an idler to improve drive belt reliability and lifespan; although other alternative of the wrap material supply system may utilize a pivoting frame (or other means for distancing the drive roll and the feed roller) in combination with an idler to selectively tension the drive belt, if so desired.

Advantageously, controlled rotation of a pivoting frame in the above-described manner may also increase angular alignment between the wrap material output trajectory and the baling chamber feed opening when the pivoting frame is rotated into pivoted position. The likelihood of wrap material misfeed may consequently be reduced, even when the wrap material is delivered into the baling chamber at a relatively high rate of speed. Further, in at least some instances, the output of the actuator may be mechanically linked to the pivoting frame through a rotatable counter knife arm in a manner ensuring that counter knife arm rotation is completed prior to pivoting of the frame from the home position into the pivoted position. In this manner, rotation of the counter knife arm and pivoting of the frame may be synchronized or coordinated in sequenced manner to further enhance the overall reliability of the baler. Such benefits are highly desirable in the agricultural industry and represent a significant advancement over conventional balers including, but not limited to, balers exclusively reliant on idler-based tensioning of the drive belt to initiate wrap material feed.

Example Embodiment of Wrap Material Supply System and Baler

FIG. 1 schematically illustrates an example round baler 10 for applying a wrap material around crop packages or bales. As previously described, application of wrap material around crop may help maintain the shape and density of baled crops, improve the weather-ability of the wrapped crop bales, and provide any number of other benefits. The wrap material may be provided as a relatively thin mesh, netting, or continuous sheet, which is drawn from a wrap material roll 12 stored within a wrap material supply system 14. The crop bales, such as an illustrated crop bale 16, are formed in a baling chamber 18 of the round baler 10. When a length of wrap material is desirably applied around the crop bale 16, the wrap material supply system 10 conveys wrap material drawn from the wrap material roll 12 into the baling chamber 18 for crop bale wrapping. Following application of an adequate amount of wrap material about the crop bale 16, the wrap material supply system 14 then severs the wrap material drawn from the wrap material roll 12 to permit ejection of the wrapped crop bale 16 from the round baler 10. One manner in which the wrap material supply system 14 may perform such functions is further described below. First, however, the round baler 10 will be discussed in greater to provide illustrative, albeit non-limiting context in which embodiments of the wrap material supply system 14 may be better understood.

In the illustrated embodiment, the round baler 10 includes a pair of ground wheels 20 and a tongue 22 facilitating towing of the baler 10 behind a tractor or other work vehicle. Depending upon implementation, the round baler 10 may not be independently powered, but rather may receive power (e.g., through a mechanical input) from the work vehicle utilized to tow the baler 10. For example, the round baler 10 may be powered through a non-illustrated power take-off (PTO) shaft, which is connected to a corresponding shaft or coupling when the round baler 10 is mated to the work vehicle. As the round baler 10 is towed or otherwise moved across a field, a crop intake assembly 24 gathers cut crop material into the baling chamber 18. The baling chamber 18 is provided in the main frame or baler housing 26 of the round baler 10; the term "baler housing," as appearing herein, defined to encompass any structural assembly including a compartment or chamber in which crop bales are formed. As further schematically shown in FIG. 1, a system of bale-forming belts 28, 30 is located within the baling chamber 18. The bale-forming belts 28, 30 include a front belt run 28 and a rear belt run 30, which are supported by a number of rotatable rolls 32 further mounted within the baler housing 26. A pair of tensioning arms 34 tensions the bale-forming belt system 28, 30 around crop bales formed within the baling chamber 18. Front and rear idler rolls 36, 38 cooperate with the belt runs 28, 30 and the tensioning arms 34 to impart the baling chamber 18 with a variable volume, which varies in relation to crop bale size at a given juncture in time. The round baler 10 may include various other non-illustrated components to further tension the bale-forming belts 28, 30 in embodiments, such as any number of tensioning springs or hydraulic cylinders.

The round baler 10 and, specifically, the crop intake assembly 24 further includes a crop intake opening 40 located adjacent a bottom portion of the baling chamber 18. A pickup 42 intakes crop products, such as a cut hay or another cereal grain, into the crop intake opening 40 as the round baler 10 is towed across a particular swath of field. A starter roll 44 is further provided proximate the crop intake opening 40 to facilitate bale formation by stripping crop material carried downwardly by the front run of belts 30. The ingested crop is then rolled into a cylindrical shape within the baling chamber 18 by motion of the bale-forming belts 28, 30. After the newly-formed bale 16 has reached a desired size as determined by a non-illustrated controller utilizing, for example, sensor data indicative of bale diameter and drive roll speed, the wrap material supply system 14 is activated to feed wrap material from the wrap material roll 12 into the baling chamber 18. Further rotation of the crop bale 16 within the baling chamber 18, as induced by the action of the bale-forming belts 28, 30, then applies the wrap material about the outer periphery of the bale 16. Depending the width of the wrap material and the dimensions of the crop bale 16, some portion of the wrap material may also extend over and partially cover the opposing bale ends. After application about the crop bale 16, the wrap material is severed by the wrap material supply system 14 at a location intermediate the newly-wrapped bale 16 and the wrap material roll 12. Following cutting of the wrap material, the newly-wrapped crop bale 16 is ejected or otherwise removed from the baling chamber 18. In this regard, a pair of gate cylinders 46 may be provided for swinging a gate 48 upwardly to an open position when it is desired to discharge the bale 16 onto the ground 50. This readies the round baler 10 for collection, formation, and wrapping of the next crop bale.

In the embodiment of FIG. 1, the wrap material supply system 14 includes a pivoting frame 52 joined to an aft or trailing end portion of baler housing 26 at a pivot point 54. As appearing herein, the terms "aft" and "trailing," and the antonyms "forward" and "leading," are defined in relation to the direction in which the round baler 10 (or other baler equipped with the wrap material supply system 14) is moved across a field during usage. An actuator 56 having an output 58 is mechanically coupled between the pivoting frame 52 and the baler housing 26. By way of non-limiting example, the actuator 56 is depicted as an electromechanical linear actuator and the actuator output 58 assumes the form of an extendable output shaft. The actuator output 58 is thus referred to as the "output shaft 58" hereafter. In other implementations, the actuator 56 can assume various other forms including that of an electric, pneumatic, hydraulic actuator having a linear or rotary output, providing that actuator 56 is controllable to pivot the frame 52 when desired and perform the other functions described below. The body or casing of the linear actuator 56 is mounted to the baler housing 26 at a mount point 60. Comparatively, the outer terminal end of the output shaft 58 (that is, the end of the output shaft 58 furthest the actuator body) is pivotally coupled to the pivoting frame 52 at a pivot point 62. The outer terminal end of the output shaft 58 is not directly connected to the pivoting frame 52 in the illustrated embodiment, but rather coupled to the pivoting frame 52 through a rotatable counter knife arm 64. The manner in which the counter knife arm 64 is rotationally coupled between the output shaft 58 and the pivoting fame 52 ensures synchronization of counter knife arm rotation and the pivoting action of frame 52. Further description of one manner in which the wrap material supply system 14 may be structurally implemented and may progress through such movements in conjunction with stroking of the output shaft 58 will now be set-forth in connection with FIGS. 2-8.

Figure 2:
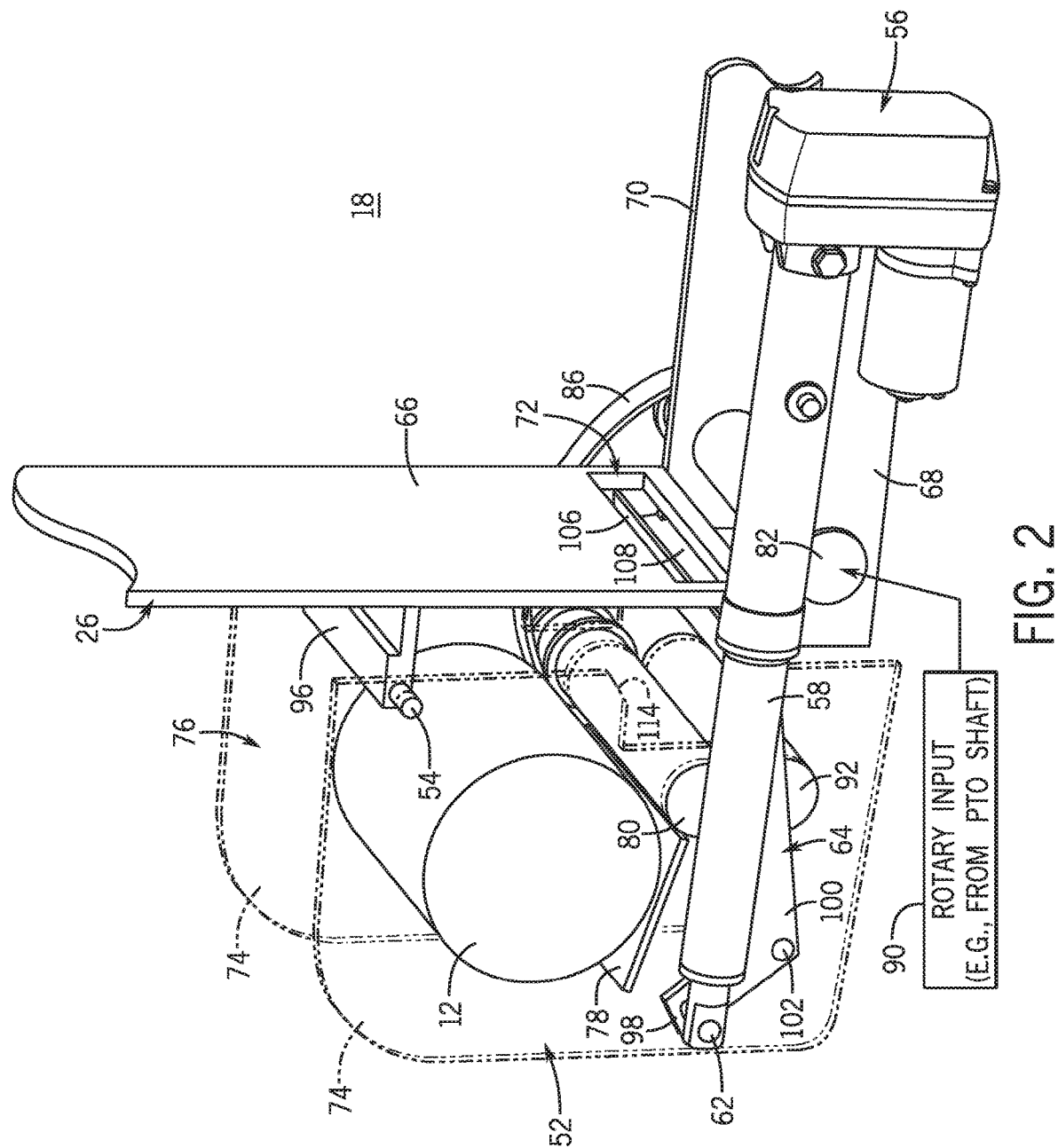
FIGS. 2 and 3 are simplified isometric side views, seen from opposing viewing angles, of the wrap material supply system in a first end (non-wrap-feed) position, as further illustrated in accordance with an example embodiment.
Figure 3:
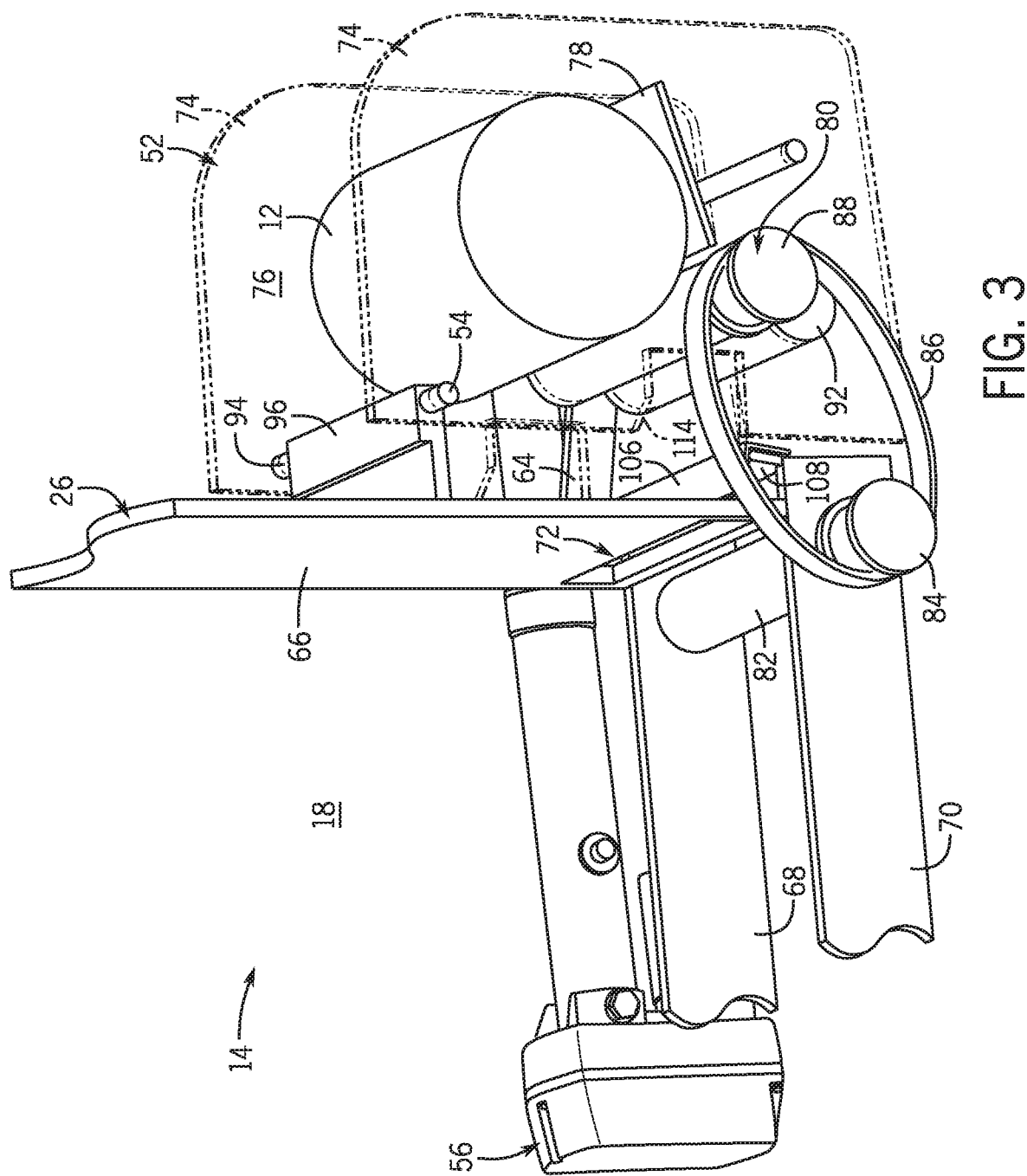

Advancing to FIGS. 2 and 3, the example wrap material supply system 14 is shown in greater detail in a first end (non-wrap-feed) position. The wrap material supply system 14 is maintained in the first end (non-wrap-feed) position during bale formation within the baling chamber 18 of the round baler 10 (FIG. 1). Only limited portions of the baler housing 26 are shown illustrative clarity of the wrap material supply system 14. The illustrated portions of the baler housing 26 include a trailing or aft housing endwall 66, a first support rail 68, and a second support rail 70. The support rails 68, 70 are spaced laterally or traversely in the illustrated example (that is, spaced along Z-axis identified by coordinate legend 71 in FIG. 1) and extend from a lower portion of the aft housing endwall 66 in a forward direction. A wrap material feed opening 72 is formed in a lower portion of the aft housing endwall 66 enabling delivery of wrap material into the baling chamber 18 of the baler housing 26. Again, the aft housing endwall 66 and the support rails 68, 70 are only partially shown in FIGS. 2 and 3 for clarity, noting that the baler housing 26 can assume various other forms and include disparate structural features in further embodiments. For example, the baler housing 26 may lack the aft housing endwall 66 in further embodiments, in which case the wrap material feed opening 72 may be defined by a separation between different runs of the bale-forming belts 28, 30 (FIG. 1) within the baling chamber 18.

The pivoting frame 52 can be assembled from any number of components suitable for supporting the wrap material roll 12 and other components contained in the wrap material supply system 14. Generally, then, the term "frame," as appearing herein, may be considered synonymous with the term "housing" or the term "chassis," which are also broadly defined. In the simplified example of FIGS. 2 and 3, the pivoting frame 52 includes two frame sidewalls 74, which are shown in phantom to reveal the wrap material roll 12 and other components internal to the pivoting frame 52. The frame sidewalls 74 are spaced laterally (again, along the Z-axis identified by coordinate legend 71 in FIG. 1) to bound or border opposing sides of a wrap material chamber 76 within the pivoting frame 52. The wrap material roll 12 is held or stored within the wrap material chamber 76. In certain implementations, additional rolls of wrap material likewise be stored in the wrap material chamber 76, providing that the volume of the chamber 76 is sufficient to accommodate multiple wrap material rolls. A support member or platform 78 is further provided in the wrap material chamber 76 and mounted between the frame sidewalls 74 for aiding in support of the wrap material roll 12. In alterative embodiments, the platform 78 may be replaced by a row of rollers or any other structural element suitable for supporting the wrap material roll 12, while allowing rotation of the wrap material roll 12 relative to the pivoting frame 42 as wrap material is drawn from the roll 12.

The pivot coupling 54 between the pivoting frame 52 and the baler housing 26 can be realized utilizing any number and type of structural components. In embodiments, the pivot coupling 54 may be formed utilizing one or more hinge pins, which rotatably mount the pivoting frame 52 to the aft housing endwall 66 at a location generally above from the wrap material feed opening 72, while being spaced from the feed opening 72 by some vertical distance or offset. In the illustrated example, specifically, a single hinge pin 94 (identified in FIG. 3) is provided and includes opposing ends extending into aligning openings provided in the frame sidewalls 74 of the pivoting frame 52. A central portion of the hinge pin 94 further extends through a channel provided in a projection, flange, or boss 96 extending from the aft housing endwall 66 in a rearward or aft direction. Accordingly, this coupling permits rotation of the pivoting frame 52 relative to the baler housing 26 such that a lower edge of the pivoting frame 52 can be moved away from or toward the baler housing 26, depending upon the current angular orientation of the frame 52. In further implementations, other structural components, such as two or more hinge pins and associated hardware (e.g., bearings), can be utilized to form the pivot coupling 54 between the pivoting frame 52 and the baler housing 26.

When loaded into the wrap material chamber 76 and supported by the platform 78, a lower portion of the wrap material roll 12 engages a rotatable feed roll 80. In this regard, the feed roll 80 may be rotatably mounted between the frame sidewalls 74 at location adjacent the wrap material roll 12 such that a central portion of the feed roll 80 contacts the outer circumferential surface of the wrap material roll 12 when loaded into the wrap material chamber 76. In various embodiments, the central portion of the feed roll 80 may be coated with a tacky material (e.g., rubberized), surrounded by a sleeve of tacky material, or otherwise treated to enhance adhesion between the outer surface of the feed roll 80 and the wrap material roll 12. Various other structural features or components, also potentially included in the wrap material supply system 14 and associated with the feed roll 80, are not shown in FIGS. 2 and 3 to avoid cluttering the drawing figures. For example, in various instances, the wrap material supply system 14 may further include any number of bearings, such as rolling element bearings, disposed between the opposing ends of the feed roll 80 and the frame sidewalls 74. So too may additional rolling element bearings be disposed at the interfaces between the other rotating components described herein (e.g., the rotating counter knife arm 64, the below-described drive roll 82, and/or the below-described guide roll 92) and the surrounding infrastructure of the wrap material supply system 14.

With continued reference to FIGS. 2 and 3, the wrap material supply system 14 further includes a drive roll 82, which is rotatably mounted between the support rails 68, 70 of the baler housing 26. During operation of the wrap material supply system 14, the drive roll 82 may be spun, either continuously or at desired operative junctures, utilizing a motor or other driver included in the wrap material supply system 14, the round baler 10 (FIG. 1), or the work vehicle behind which the baler 10 is towed. To help emphasize that the drive roll 82 may be driven in various different manners, the rotary input to the drive roll 82 is generically represented in FIG. 2 by a graphic 90. In certain implementations, and by way of non-limiting example, the drive roll 82 may be rotationally driven through a PTO shaft of the round baler 10, which is, in turn, coupled to a mating PTO shaft on a tractor or other vehicle utilized to tow the baler 10. In other instances, rotation of the drive roll 82 may be driven by an electric or hydraulic motor further contained in the baler 10; or, perhaps, within the wrap material delivery system 14 itself. Gearing and reductions may also be provided, as appropriate, in such instances. As shown most clearly in FIG. 3, the drive roll 82 includes an enlarged pulley end 84 projecting from one of the sidewalls 74 of the pivoting frame 52. A drive belt 86, such as a V-belt, extends around the pulley end 84 of the drive roll 82. The drive belt 86 likewise extends around a pulley end 88 of the feed roll 80, which projects from the same frame sidewall 74 as does the pulley end 84 of the drive roll 82.

Any number of additional rolls may be included in the wrap material supply system 14 and utilized to guide wrap material drawn from the wrap material roll 12, through the feed opening 72, and into the baling chamber 18. In the illustrated embodiment, the wrap material supply system 14 further includes a single guide roll 92, which is located adjacent and generally beneath the feed roll 80. Collectively, the feed roll 80 and the guide roll 92 form a material-contacting roll assembly 80, 92. The guide roll 92 may be rotationally coupled to the drive roll 80, whether by direct contact, through gearing, through a flexible linkage (e.g., a belt), or in another manner, such that the guide roll 92 co-rotates with the feed roll 80. In other embodiments, the drive roll 80 may be capable of independent rotation relative to the drive roll 80; e.g., the guide roll 80 may be mounted between the sidewalls 74 of the pivoting frame 52 such that the roll 80 may freely spin. In this latter case, the guide roll 92 may rotate when wrap material passes between the feed roll 80 and the guide roll 92 for delivery into the baling chamber 18 through the feed opening 72 in the aft housing endwall 66. The material-contacting surface of the guide roll 92 can be treated or coated in any manner suitable for guiding drawn wrap material into the feed opening 72. In one embodiment, the outer circumferential surface of the guide roll 92 is imparted with a metallic plating, such as a zinc-plated surface finish. In other instances, the guide roll 92 may have a different surface finish or coating, such as a rubberized surface coating (or sleeve) similar to that described above in connection with the feed roll 80. In still further embodiments, the wrap material supply system 14 may lack the guide roll 92, may include any number of additional material-contacting guide rolls, or may include various other structural features aiding in the conveyance of wrap material drawn from the wrap material roll 12 into the baling chamber 18.

When the wrap material supply system 14 resides in the first end (non-wrap-feed) position, and by extension when the pivotinq frame 52 resides in its non-pivoted home position, the drive belt 86 resides in a slack state, as visually exaggerated in FIGS. 2 and 3 for emphasis. When slack or non-tensioned in this manner, the drive belt 86 transfers essentially zero rotary motion of the spinning drive roll 82 to the feed roll 80. Additionally, in certain embodiments, a non-illustrated brake may be applied to the drive roll 82 to deter drive roll rotation when the wrap material delivery system 14. When properly tensioned, the drive belt 86 transmits rotation from the spinning drive roll 82 to the feed roll 80. In accordance with embodiments of the present disclosure, tensioning of the drive belt 86 is accomplished by increasing the distance between the spinning drive roll 82 and the feed roll 80, whether through movement of the drive roll 82, through movement of the feed roll 80, or a combination thereof. In the illustrated example, specifically, the drive belt 86 is tensioned through controlled pivoting movement of the pivoting frame 52 about the pivot point 54 relative to the baler housing 26. Pivoting movement of the frame 82 is controlled utilizing the actuator 56 coupled between the frame 82 and the baler housing 26. The output shaft 58 of the actuator 56 may be mechanically coupled to the pivoting frame 52 directly or through any number of intervening components. For example, as indicated in FIGS. 2 and 3, the output shaft 58 may be mechanically linked to the pivoting frame 52 through the counter knife arm 64.

As noted above, the output shaft 58 of the actuator 56 is mechanically linked to the pivoting frame 52 through the counter knife arm 64 in the illustrated embodiment. In particular, the counter knife arm 64 includes a first end portion 98 pivotally joined to the outer terminal end of the output shaft 58 at pivot coupling or joint 62, as well as an intermediate portion 100 pivotally joined to the pivoting frame 52 at a further pivot coupling 102. The pivot coupling 102 may also be described as a "second pivot point," which is located generally below and aft of the first pivot point 54 at which the pivoting frame 52 is coupled to the baler housing 26. The counter knife arm 64 further includes a second end portion 104 (identified in FIGS. 4 and 6), which is located opposite the first end portion 98 and to which a counter knife angle 106 is fixedly mounted. The counter knife arm 64 and the counter knife angle 106 may be integrally formed a single piece; or, instead, separately fabricate and fixedly joined by welding, utilizing mechanical fasteners, or utilizing a different joinder technique. The counter knife arm 64 is rotatable about the pivot coupling 102 between a lowered position (shown in FIGS. 2 and 3) and a raised position (shown in FIGS. 4-8, described below). In the lowered position shown in FIGS. 2 and 3, the counter knife angle 106 contacts a stationary knife 108 projecting upwardly from the baler housing 26. The stationary knife 108 is mounted between the support rails 68, 70 at a location adjacent (e.g., slightly aft of) the wrap material feed opening 72. The counter knife angle 106 and the stationary knife 108 may be utilized to sever cooperate to sever the wrap material drawn from the wrap material roll 12 following delivery into the baling chamber 18 of the baler 10, as further discussed below in connection with FIGS. 6-8.

Figure 6:
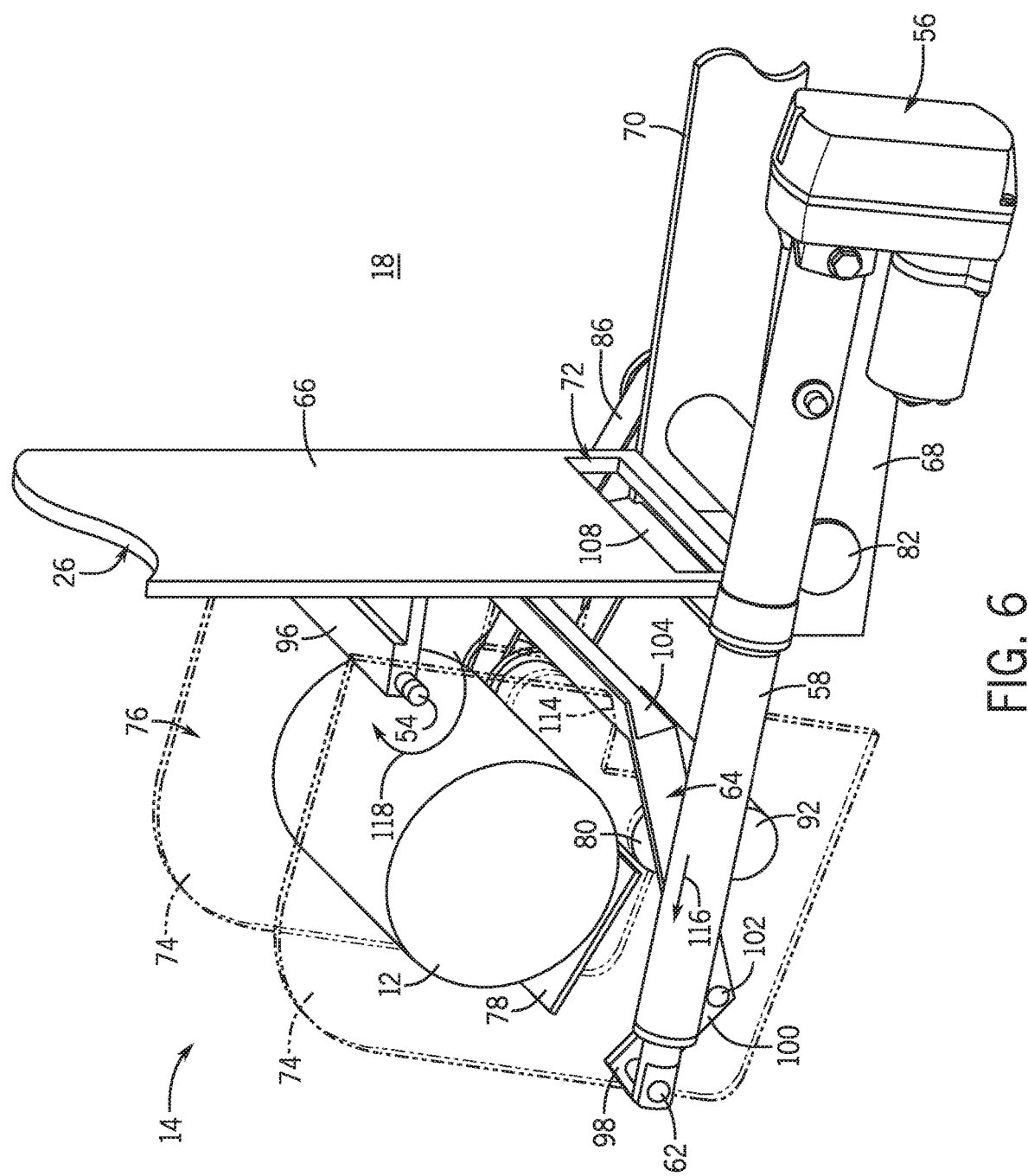
FIGS. 6 and 7 are simplified isometric views, seen from opposing viewing angles, of the wrap material supply system shown in FIGS. 2-5 in a second end (wrap-feed) position.
Figure 7:
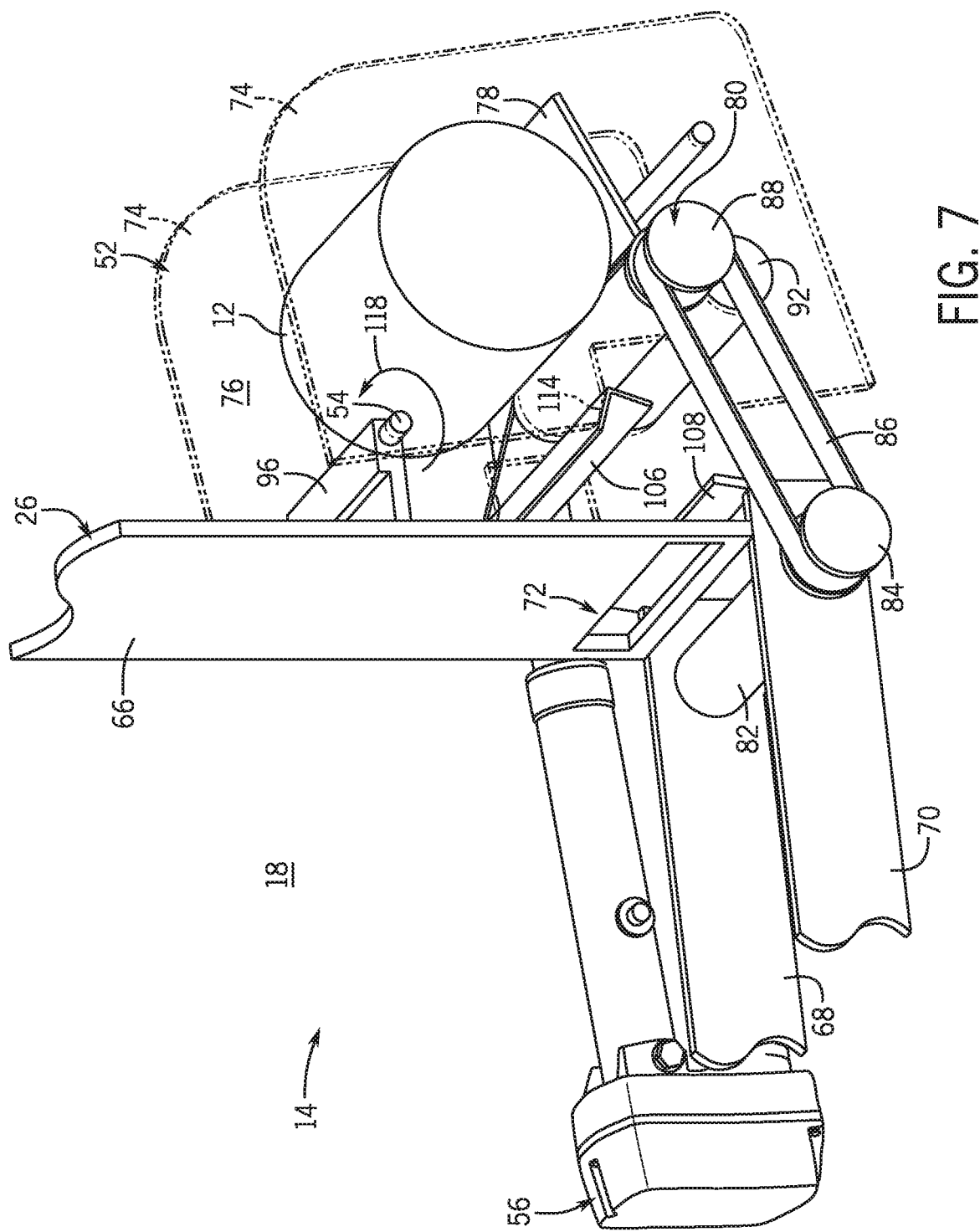

In FIGS. 2 and 3, the output shaft 58 of the actuator 56 resides in a fully retracted position. As appearing herein, the term "fully retracted position" refers to a position in which the retraction of the output shaft is greatest under normal operating conditions and not precluding the possibly that the actuator (e.g., the actuator 56) may be capable of further retracting its output shaft (e.g., the output shaft 58) beyond the fully retracted position. When the output shaft 58 of the actuator 56 resides in the fully retracted position, the pivoting frame 52 remains in the non-pivoted home position. In the home position, the lower forward edge portion of the pivoting frame 52 is located adjacent a lower aft edge portion of the baler housing 26. The distance between the drive roll 84 and the feed roll 80 is thus maintained at a minimum value, the drive belt 86 resides in a slack state, the drive roll 84 remains undriven and rotationally static. Accordingly, wrap material is not drawn from the wrap material roll 12, nor delivered into the baling chamber 18 of the round baler 10. The wrap material supply system 14 is thus essentially inactive at this juncture in time. Subsequently, the wrap delivery system 14 is activated by the round baler 10 to initiate delivery of wrap material from the wrap material roll 12 into the baling chamber 18 for application around crop bales formed therein. For example, a non-illustrated controller onboard the round baler 10 (FIG. 1) may estimate the size of the crop bale 16 utilizing the previously-mentioned sensor inputs; and, when determining that the crop bale 16 has reached a desired size, transmit command signals to the actuator 56 to begin extension of the output shaft 58 from the fully retracted position (FIGS. 2 and 3) toward a fully extend position (FIGS. 6 and 7). In the illustrated example in which the actuator 56 assumes the form of an electromechanical actuator, electrical control signals may be transmitted directly to the actuator 56 to effectuate this action. In other embodiments in which the actuator 56 is a pneumatic or hydraulic actuator, command signals may be transmitted to a control valve or system, which then varies flow or pressurize of a fluid supplied to the actuator 56 to initiate extension of the output shaft 58.

Figure 4:
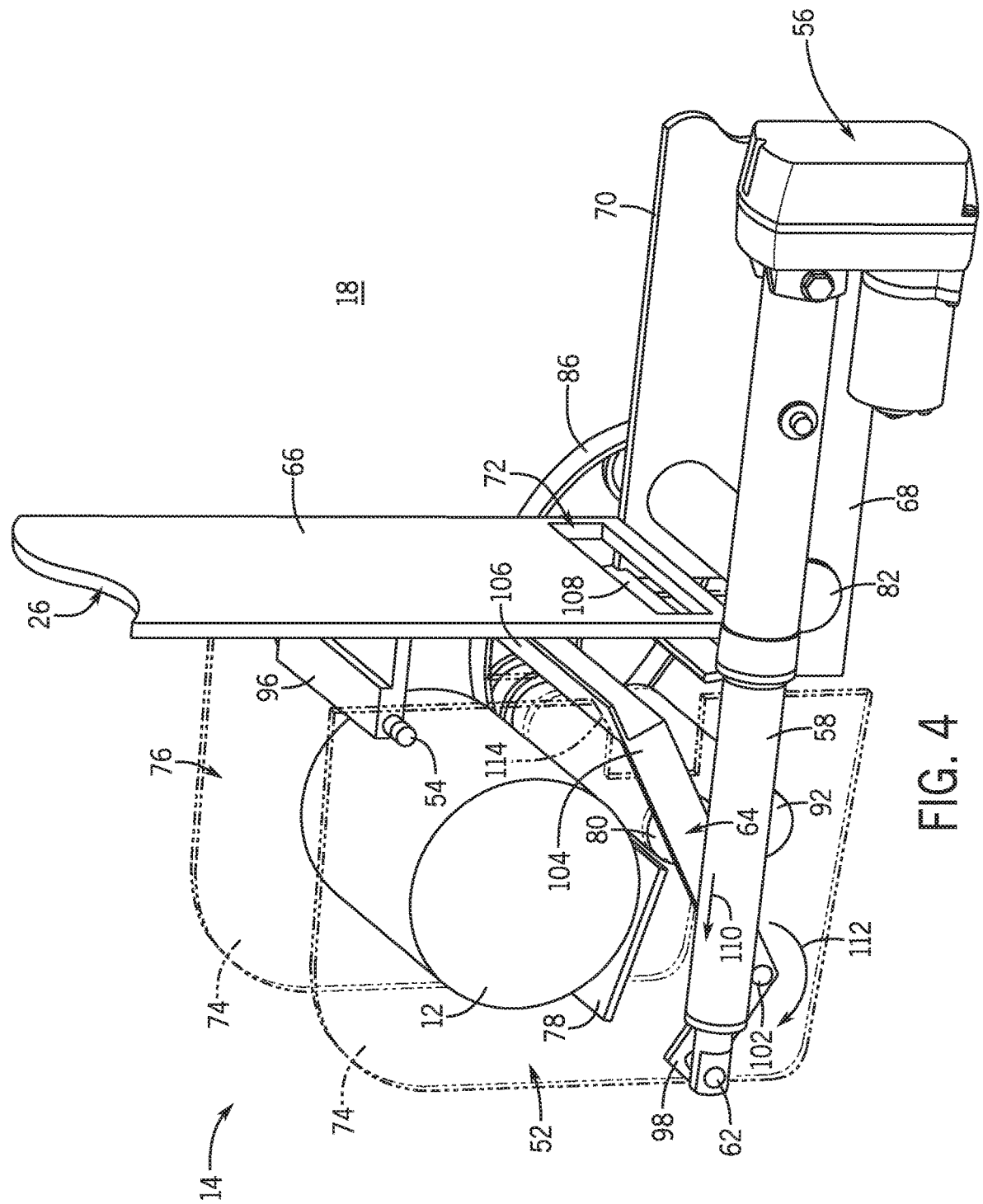
FIGS. 4 and 5 are simplified isometric side views, seen from opposing viewing angles, of the wrap material supply system shown in FIGS. 2 and 3 in an intermediate position.
Figure 5:
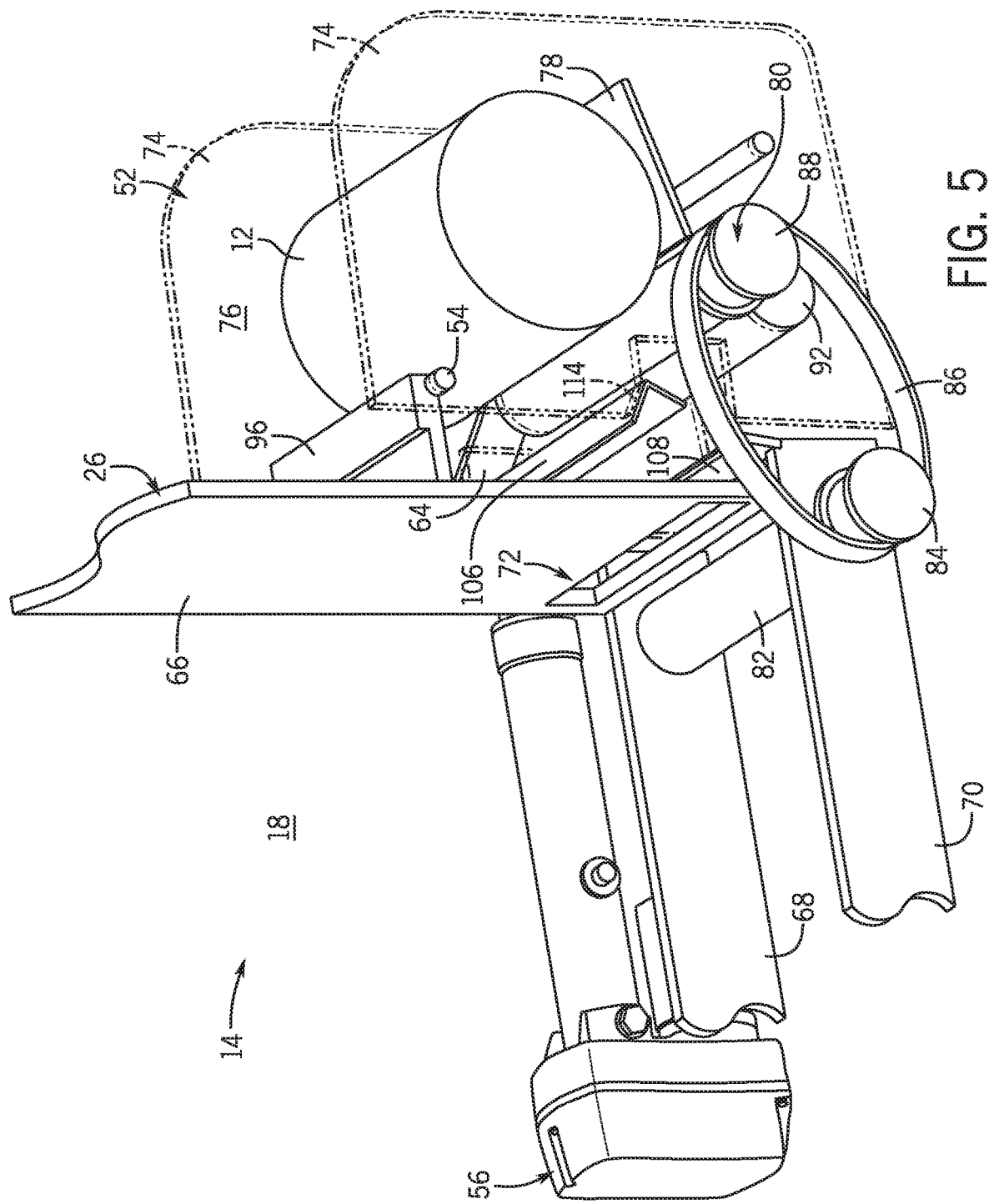

Turning to FIGS. 4 and 5, the output shaft 58 of the actuator 56 extends into an intermediate position between the fully retracted position (FIGS. 2 and 3) and the fully extended position (FIGS. 6 and 7). Extension of the output shaft 58, as represented by arrow 110 in FIG. 4, causes the counter knife arm 64 to rotate in the rotational direction identified by arrow 112. In particular, as the output shaft 58 extends into the intermediate position, force is transmitted to the far end 98 of the counter knife arm 64 through the pivot coupling 62; the term "far," and the antonym "near," defined with respect to proximity to the baler housing 26. Given the relatively small mass of the counter knife arm 64 relative to the greater mass of the pivoting frame 52, the wrap material roll 12, and the various other components joined to the pivoting frame 52, the counter knife arm 64 is forced to rotate relative to the pivoting frame 52 about the pivot joint 102. This causes the near end 104 of the counter knife arm 64 to rotate in a first rotational direction such that the counter knife angle 106 lifts from the stationary knife 108, as shown. The counter knife angle 106 passes through the wrap material path; however, this is non-problematic as wrap material is not currently delivered into the baling chamber 18 by the wrap material supply system 14. Rotation of the counter knife arm 64 continues in this manner until the counter knife arm 64 or the counter knife angle 106 contacts a stop feature. For example, as shown in FIGS. 3 and 4, a hard stop feature 114 may be present on the pivoting frame 52 (e.g., integrally formed with or fixedly attached to the frame sidewalls 74) and engaged by the counter knife angle 106 when the counter knife arm 64 rotates fully into the raised position. Further rotation of the counter knife arm 64 relative to the pivoting frame 52 is thus prevented by the hard stop feature 114.

Referring next to FIGS. 6 and 7, the output shaft 58 continues to extend from the intermediate position (FIGS. 4 and 5) into the fully extended position. Further extension of the output shaft 58 is represented in FIG. 6 by arrow 116. As further rotation of the counter knife arm 64 relative to the pivoting frame 52 is prevented by the hard stop feature 114, the pivoting frame 52 is required to rotate about pivot point 54 as the output shaft 58 moves into the fully extended position. Pivoting of the frame 52 thus results, with the lower forward edge of the pivoting frame 52 moving away from the lower aft edge of the baler housing 26 in the manner indicated in FIGS. 6 and 7 by arrows 118. Such pivoting action of the frame 52 increases the distance between the spinning drive roll 82 and the feed roll 80 to tension the drive belt 86, as shown most clearly in FIG. 7. As previously indicated, this second, angularly-displaced or tilted position into which the frame 52 is pivoted is referred to herein as the "pivoted position." Rotation the pivoting frame 52 into the pivoted position increases the spacing between the feed roll 80 from the drive roll 82; and, specifically, between the respective rotational axes of rolls 80, 82. Stated differently, when the pivoting frame 52 is rotated into the pivoted position, rolls 80, 82 are spaced by a second distance, which is greater than the first distance in which roll 80, 82 are spaced when the frame 52 resides in the home position (FIGS. 2 and 3). Accordingly, as the output shaft 58 moves into the fully extended position, the drive belt 86 becomes sufficiently tensioned to now transmit rotation from the drive roll 82 to the feed roll 80. Tensioning of the drive belt 86 initiates feeding of wrap material from the feed roll 80, through the material-contacting roll assembly 80, 92, through the wrap material feed opening 72, and into the baling chamber 18 for application around the crop bale 16 (FIG. 1). Feeding of the wrap material from the wrap material roll 12 is not shown in FIGS. 6 and 7 for clarity, but is generally illustrated in FIG. 8 and discussed below.

As wrap material is delivered into the baling chamber 18 by the wrap material supply system 14, further action of the bale-forming belts 28, 30 (FIG. 1) winds the wrap material about the crop bale 16, as previously described. Following sufficient application of the wrap material about the crop bale 16, feeding of the wrap material by the wrap material supply system 14 is halted and the drawn wrap material is severed at a location between the wrapped crop bale 16 and the wrap material roll 12. Referring collectively to FIGS. 2-8, this is accomplished by commanding the actuator 56 to begin retraction of the output shaft 58 from the fully extended position shown in FIGS. 6 and 7 in a direction opposite arrow 116 (FIG. 6). Retraction of the actuator output shaft 58 from the fully extended position (FIGS. 6 and 7) and toward the intermediate position (FIGS. 4 and 5) allows the pivoting frame 52 to rotate in an opposing rotational direction (opposite arrows 118 in FIGS. 6 and 7) and return to the non-pivoted home position. Concurrently, the drive belt 86 returns to the slack state shown in FIGS. 4 and 5, and rotary motion is no longer transmitted from the drive roll 82 to the feed roll 80. A non-illustrated brake may also be applied to the feed roll 80, to the guide roll 92, and/or to the wrap material roll 12 in certain embodiments. Cessation of rotation of the feed roll 80 halts conveyance of wrap material from the wrap material roll 12 into the baling chamber 18.

Next, the output shaft 58 of the actuator 56 continues to retract from the intermediate position (FIGS. 4 and 5) toward the fully retracted position (FIGS. 2 and 3). As the pivoting frame 52 has returned to the home position, further retraction of the output shaft 58 results in rotation of the counter knife arm 64 in a rotational direction opposite arrow 112 in FIG. 4. The near end 104 of the counter knife arm 64 thus rotates downwardly to lower the counter knife angle 106 toward the stationary knife 108. Counter knife angle 106 moves away from the hard stop feature 114, engages the newly-drawn wrap material proximate the wrap material feed opening 72, and continues to rotate downward. When the output shaft 58 reaches the fully retracted position (FIGS. 2 and 3), the counter knife angle 106 is lowered onto the stationary knife 108, with a section of the wrap material pinched between the counter knife angle 106 and the stationary knife 108. This severs the pinched section of the wrap material completing the wrap material conveyance and cutting processes performed by the wrap material supply system 14. The newly-wrapped crop bale 16 (FIG. 1) may now be ejected from the baling chamber 18 and the above-described process steps repeated, on an iterative basis, to produce additional crop bales, as desired.

By virtue of the above-described process steps or functionalities, tensioning of the drive belt 86 is achieved without reliance of an idler to improve drive belt lifespan, decrease the likelihood belt under-tensioning or over-tensioning, and provide other such benefits. This not improves the performance of the wrap material supply system 14, but further prolongs the service life of the drive belt 86. Moreover, by virtue of the above-described architecture, rotation of the counter knife arm 64 and pivoting action of the frame 52 can be driven by a single actuator 56, while occurring in a highly coordinate sequence. Consider, for example, extension of the output shaft 58 of the actuator 56 from the fully retracted position (FIGS. 2 and 3) into the fully extended position (FIGS. 6 and 7). Here, rotation of the counter knife arm 64 will reliably occur and complete its desired angular range of motion (bringing the counter knife arm 106 into contact with hard stop feature 114) prior to tilting of the pivoting frame 52, tensioning of the drive belt 86, and feeding of wrap material from the wrap material roll 12. Conversely, as the output shaft 58 retracts from the fully extended position (FIGS. 6 and 8) into the fully retracted position (FIGS. 2 and 3), the pivoting frame 52 rotates to return to the home position prior to rotation of the counter knife arm 64 in the opposing direction, lowering of the counter knife angle 106 onto the stationary knife 108, and severing of the wrap material drawn from the roll 12. Such sequenced motion ensures that the desired steps or functions are performed in their proper order to further increase the overall reliability of the wrap material supply system 14 and, more generally, the round baler 10.

As still further benefit, in embodiments of the wrap material supply system 14, pivoting of the frame 52 in the manner previously described may favorably increase angular alignment between the wrap material output trajectory and the baling chamber feed opening 72 when the pivoting frame 52 is rotated into the pivoted position. This may be appreciated more fully by referring to the schematic presented in FIG. 8. In this drawing figure, the arrow 120 represents the motion of the pivoting frame 52 when rotated into the pivoted position. Comparatively, the dashed line 122 represents an example non-linear path potentially traveled by the wrap material drawn from the wrap material roll 12 when delivered into the wrap material feed opening 72 at a relatively high rate of speed. As can be seen, tilting of the pivoting frame 52 in the manner indicated by arrow 120 shifts, rotates, or points the output trajectory of the wrap material (that is, the trajectory of the wrap material when discharged from material-contacting roll assembly 80, 92, represented by arrow 124) toward the wrap feeding material opening 72. Rotation of the pivoting frame 52 about the pivot point 54 and toward the pivoted position (again, also shown in FIGS. 6 and 7) consequently decreases, if not eliminates any angular disparity or mismatch between the output trajectory of the wrap material (arrow 124) relative to the location of the wrap material feed opening 72.

By increasing the angular alignment between the wrap material output trajectory and the wrap material feed opening 72 through pivoting action of the frame 52, clearances can be maximized between the wrap material flight path from the roll assembly 90, 92 to the wrap material feed opening 72 and the surrounding infrastructure, including the raised counter knife angle 106 and the counter knife 108. The likelihood of inadvertent contact between the wrap material delivered into the baling chamber 18 and the surrounding static infrastructure is thereby reduced. As a result, even when the wrap material follows a somewhat non-linear path in unguided flight into the wrap material feed opening 72, such as the sinusoidal path represented in FIG. 8 by dashed line 122 (e.g., as may occur when the feed roller 80 rotates at a higher rate of speed and/or when adhesion between the feed roller 80 and the drawn roll material is relatively strong), the wrap material will still typically pass between the raised counter knife angle 106 and the stationary counter knife 108 without impingement on either structure. The likelihood of wrap material misfeed is consequently reduced to further improve the overall reliability of the wrap material supply system 14 and of the round baler 10, generally.

Tilting or shifting the orientation of the rolls 80, 92 in conjunction with pivoting of the frame 52 into the pivoted position may be further be described in terms of rotation of the nip formed between rolls 80, 92; the term "nip," as appearing, referring to the location at which rolls 80, 92 contact tangentially, or (if rolls 80, 92 are closely positioned, but non-contacting) the location at which rolls 80, 82 are in closest proximity, to pick-up or engage the wrap material drawn from wrap material roll 12. Rotation of the pivoting frame 52 into the pivoted position thus angularly shifts the rolls 80, 92 (or, more generally, the material-contacting roll assembly 80, 92) such that the nip formed between the rolls 80, 92 rotates to point toward the center of the wrap material feed opening 72 in the baler housing 26. Further, in certain implementations, a straight line projecting from the nip between the rolls 80, 92 (again, extending in the direction indicated by the arrow 124) may intersect the wrap material feed opening 72 when the pivoting frame 52 is rotated into the pivoted position. Specifically, such a straight line projecting from the nip of rolls 80, 92 may intersect a center region of the wrap material feed opening 72 when the pivoting frame 52 is rotated into the pivoted position; and, when the pivoting frame 52 instead resides in the non-pivoted home position, the straight line may instead bypass (e.g., pass above) the center region of the feed opening 72. In such embodiments, the wrap material supply system 14 may thus be described as containing a material-contacting roll assembly 80, 92 supported by the pivoting frame 52, which (when rotationally driven) discharges wrap material toward the material feed opening 72 at a particular wrap material output trajectory 124, with the output trajectory 124 shifted toward the center of the wrap material feed opening 72 when the pivoting frame 52 rotates from the home position into the pivoted position shown in FIG. 8. Further, when the pivoting fame 52 resides in the pivoted position, a straight line extending from the nip in the direction of the wrap material output trajectory 124 may intersect the wrap material feed opening 72 in the baler housing 26.

Enumerated Examples of the Wrap Material Supply System

The following examples of the wrap material supply system are further provided and numbered for ease of reference.

1. In an embodiment, the wrap material supply system includes a baler housing containing a baling chamber, a drive roll rotatably mounted to the baler housing, and a pivoting frame coupled to the baler housing at a first pivot point. A feed roll is rotatably mounted to the pivoting frame and positioned to engage the wrap material roll when loaded into the wrap material supply system. A drive belt transmits rotation from the drive roll to the feed roll when the drive belt is tensioned. An actuator mechanically linked to the pivoting frame and controllable to rotate the pivoting frame about the first pivot point to move the feed roll relative to the drive roll, tension the drive belt, and initiate feeding of the wrap material from the wrap material roll into the baling chamber.

2. The wrap material supply system of example 1, wherein the pivoting frame is rotatable about the first pivot point between: (i) a home position in which the feed roll is spaced from the drive roll by a first distance, and (ii) a pivoted position in which the feed roll is spaced from the drive roll by a second distance greater than the first distance.

3. The wrap material supply system of example 2, wherein the drive belt is placed in a slack state when the pivoting frame resides in the home position to rotationally decouple the feed roll from the drive roll; and a tensioned state when the pivoting frame resides in the pivoted position to rotationally couple the feed roll to the drive roll.

4. The wrap material supply system of example 2, further including a wrap material feed opening to the baling chamber, wherein the wrap material is imparted with a wrap material output trajectory when discharged from the feed roll, wherein rotation of the pivoting frame from the home position into the pivoted position rotates the wrap material output trajectory toward the feed opening.

5. The wrap material supply system of example 1, further including a counter knife arm mechanically coupled between an output of the actuator and the pivoting frame.

6. The wrap material supply system of example 5, wherein the output of the actuator is movable from a first end position, through an intermediate position, and to a second end position. The counter knife arm rotates about a second pivot point as the output of the actuator moves from the first end position into the intermediate position, while the pivoting frame remains substantially stationary taken about the first pivot point. The pivoting frame rotates about the first pivot point as the output of the actuator moves from the intermediate position into the second end position, while the counter knife arm remains substantially stationary taken about the second pivot point.

7. The wrap material supply system of example 6, further including a stop feature fixedly coupled to the baler housing and positioned to arrest rotation of the counter knife arm in a first direction when the output of the actuator moves into the intermediate position.

8. The wrap material supply system of example 5, wherein the counter knife arm includes: a first end portion coupled to the output of the actuator; a second end portion terminating in a counter knife angle; and an intermediate portion between the first end portion and the second end portion, the intermediate portion coupled to the pivoting frame a second pivot point.

9. The wrap material supply system of example 8, wherein the second pivot point is located below and aft of the first pivot point.

10. In another embodiment, the wrap material supply system includes a drive roll rotationally driven during operation of the wrap material supply system; a feed roll positioned to engage the wrap material roll when loaded into the wrap material supply system; a drive belt transmitting rotation from the drive roll to the feed roll when the drive belt is tensioned; a counter knife arm rotatable relative to the feed roll; and an actuator having an output mechanically linked to the counter knife arm and movable from a first end position, through an intermediate position, and to a second end position. The counter knife arm rotates as the output of the actuator moves from the first end position into the intermediate position, while the drive belt remains in a slack state in which the drive roll and the feed roll are rotationally decoupled. The drive belt is tensioned to initiate feeding of the wrap material from the wrap material roll as the output of the actuator moves from the intermediate position into the second end position.

11. The wrap material supply system of example 10, wherein the counter knife arm remains substantially stationary as the output of the actuator moves from the intermediate position into the second end position.

12. The wrap material supply system of example 10, wherein a rotational axis of the feed roll is spaced from a rotational axis of the drive roll by a roll spacing. As the output of the actuator moves from the intermediate position into the second end position, the roll spacing increases to tension the drive belt and initiate feeding of the wrap material from the wrap material roll.

13. The wrap material supply system of example 10, further including a pivoting frame rotatable about a first pivot point and supporting the feed roll, while the counter knife arm is coupled to the pivoting frame at a second pivot point.

14. The wrap material supply system of example 13, further including baler housing containing a baling chamber and a feed opening through which the wrap material is delivered into the baling chamber, while the pivoting frame is joined to the baler housing at the first pivot point.

15. The wrap material supply system of example 14, further including: a stationary knife mounted to the baler housing; and a counter knife angle affixed to an end portion of the counter knife arm and brought into contact with stationary knife by rotation of the counter knife arm rotates when the output of the actuator moves from the intermediate position into the first end position.

CONCLUSION

The foregoing has thus provided enhanced wrap material supply systems, which provide improved uniformity in the application of properly-stretched wrap material around crop bales, while decreasing the likelihood of wrap material misfeed. In various embodiments, the enhanced wrap material supply system utilizes selective tensioning of a drive belt to rotationally couple and decouple a drive roll and a feed roll. Such tensioning is accomplished, at least in part, by distancing the feed roll and drive roll to eliminate (or at least reduce) reliance on idler-based tensioning. The overall reliability of the wrap material supply system and the service life of the drive belt may be improved of the result. Concurrently, elimination of the idler (and the potential provision of certain other structure features) ensures greater uniformity in tensioning the belt across iterations of the bale wrapping process, which reduces sensitivity to variations in actuator output force. Further, embodiments of the wrap material supply system are may utilize a single actuator to drive the movements associated with wrap feeding and cutting in a highly synchronized manner, as previously described.

As appearing herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A wrap material supply system utilized to deliver wrap material from a wrap material roll for application around a crop bale, the wrap material supply system comprising:
   a baler housing containing a baling chamber and having a wrap material feed opening to the baling chamber;
   a drive roll rotatably mounted to the baler housing;
   a pivoting frame coupled to the baler housing at a first pivot point;
   a feed roll being rotatably mounted to the pivoting frame and being positioned to engage the wrap material roll;
   a drive belt transmitting rotation from the drive roll to the feed roll when the drive belt is tensioned; and
   an actuator mechanically linked to the pivoting frame and controllable to rotate the pivoting frame about the first pivot point to move the feed roll relative to the drive roll, tension the drive belt, and initiate feeding of the wrap material from the wrap material roll into the baling chamber;

wherein the pivoting frame is rotatable about the first pivot point between a home position in which the feed roll is spaced from the drive roll by a first distance and a pivoted position in which the feed roll is spaced from the drive roll by a second distance greater than the first distance; and wherein the wrap material is imparted with a wrap material output trajectory when discharged from the feed roll and rotation of the pivoting frame from the home position into the pivoted position rotates the wrap material output trajectory toward the feed opening.

2. The wrap material supply system of claim 1, wherein the drive belt is placed in:

a slack state when the pivoting frame resides in the home position to rotationally decouple the feed roll from the drive roll; and a tensioned state when the pivoting frame resides in the pivoted position to rotationally couple the feed roll to the drive roll.

3. The wrap material supply system of claim 1, further comprising a counter knife arm mechanically coupled between an output of the actuator and the pivoting frame.

4. The wrap material supply system of claim 3, wherein the output of the actuator is movable from a first end position, through an intermediate position, and to a second end position;

wherein the counter knife arm rotates about a second pivot point as the output of the actuator moves from the first end position into the intermediate position, while the pivoting frame is stationary relative to the first pivot point; and wherein the pivoting frame rotates about the first pivot point as the output of the actuator moves from the intermediate position into the second end position, while the counter knife arm is stationary relative to the second pivot point.

5. A wrap material supply system utilized to deliver wrap material from a wrap material roll for application around a crop bale, the wrap material supply system comprising:

a baler housing containing a baling chamber;
a drive roll rotatably mounted to the baler housing;
a pivoting frame coupled to the baler housing at a first pivot point;
a feed roll being rotatably mounted to the pivoting frame and being positioned to engage the wrap material roll;
a drive belt transmitting rotation from the drive roll to the feed roll when the drive belt is tensioned;
an actuator mechanically linked to the pivoting frame and controllable to rotate the pivoting frame about the first pivot point to move the feed roll relative to the drive roll, tension the drive belt, and initiate feeding of the wrap material from the wrap material roll into the baling chamber, wherein an output of the actuator is movable from a first end position, through an intermediate position, and to a second end position;
a counter knife arm mechanically coupled between the output of the actuator and the pivoting frame, wherein the counter knife arm rotates about a second pivot point as the output of the actuator moves from the first end position into the intermediate position, while the pivoting frame is stationary relative to the first pivot point, and wherein the pivoting frame rotates about the first pivot point as the output of the actuator moves from the intermediate position into the second end position, while the counter knife arm is stationary relative to the second pivot point; and a stop feature fixedly coupled to the baler housing and positioned to arrest rotation of the counter knife arm in a first direction when the output of the actuator moves into the intermediate position.

6. A wrap material supply system utilized to deliver wrap material from a wrap material roll for application around a crop bale, the wrap material supply system comprising:

a baler housing containing a baling chamber;
a drive roll rotatably mounted to the baler housing;
a pivoting frame coupled to the baler housing at a first pivot point;
a feed roll being rotatably mounted to the pivoting frame and being positioned to engage the wrap material roll;
a drive belt transmitting rotation from the drive roll to the feed roll when the drive belt is tensioned;
an actuator mechanically linked to the pivoting frame and controllable to rotate the pivoting frame about the first pivot point to move the feed roll relative to the drive roll, tension the drive belt, and initiate feeding of the wrap material from the wrap material roll into the baling chamber; and
a counter knife arm mechanically coupled between an output of the actuator and the pivoting frame;
wherein the counter knife arm comprises:
a first end portion coupled to the output of the actuator;
a second end portion terminating in a counter knife angle; and
an intermediate portion between the first end portion and the second end portion, the intermediate portion coupled to the pivoting frame at a second pivot point.

7. The wrap material supply system of claim 6, wherein the second pivot point is located below and aft of the first pivot point.

8. A wrap material supply system utilized to deliver wrap material from a wrap material roll for application around a crop bale, the wrap material supply system comprising:

a baler housing containing a baling chamber;
a pivoting frame coupled to the baler housing at a first pivot point;
a drive roll rotationally driven during operation of the wrap material supply system;
a feed roll mounted to the pivoting frame and positioned to engage the wrap material roll;
a drive belt transmitting rotation from the drive roll to the feed roll when the drive belt is tensioned; and
an actuator mechanically linked to the pivoting frame to move the feed roll relative to the drive roll and comprising an output being movable from a first end position, through an intermediate position, and to a second end position;
wherein the output of the actuator moves from the first end position into the intermediate position, while the drive belt remains in a slack state in which the drive roll and the feed roll are rotationally decoupled;
wherein the drive belt is tensioned to initiate feeding of the wrap material from the wrap material roll as the output of the actuator moves from the intermediate position into the second end position;
wherein a rotational axis of the feed roll is spaced from a rotational axis of the drive roll by a roll spacing; and
wherein, as the output of the actuator moves from the intermediate position into the second end position, the roll spacing increases to tension the drive belt and initiate feeding of the wrap material from the wrap material roll.

9. The wrap material supply system of claim 8, further comprising a counter knife arm rotatable relative to the feed roll and mechanically linked to the output of the actuator;
wherein the counter knife arm is stationary as the output of the actuator moves from the intermediate position into the second end position.

10. The wrap material supply system of claim 9, wherein the counter knife arm is coupled to the pivoting frame at a second pivot point.

11. The wrap material supply system of claim 10, further comprising:
a stationary knife mounted to the baler housing; and
a counter knife angle affixed to an end portion of the counter knife arm and brought into contact with the stationary knife by rotation of the counter knife arm when the output of the actuator moves from the intermediate position into the first end position.

12. A wrap material supply system utilized to deliver wrap material from a wrap material roll for application around a crop bale, the wrap material supply system comprising:
a baler housing containing a baling chamber and a feed opening through which the wrap material is delivered into the baling chamber;
a pivoting frame coupled to the baler housing at a first pivot point;
a drive roll coupled to the baler housing and rotatable relative thereto;
a feed roll positioned to engage the wrap material roll;
a drive belt extending around the drive roll and the feed roll, the drive belt residing in (i) a slack state when the pivoting frame resides in a home position to rotationally decouple the feed roll from the drive roll, and (ii) a tensioned state when the pivoting frame resides in a pivoted position to rotationally couple the feed roll to the drive roll;
an actuator coupled between the baler housing and the pivoting frame, the actuator controllable to rotate the pivoting frame about the first pivot point from the home position to the pivoted position; and
a material-contacting roll assembly, comprising the feed roll, supported by the pivoting frame and, when rotationally driven, delivering the wrap material from the wrap material roll and into the feed opening;
wherein the pivoting frame is rotatable about the first pivot point between the home position in which the feed roll is spaced from the drive roll by a first distance and the pivoted position in which the feed roll is spaced from the drive roll by a second distance greater than the first distance;
wherein the wrap material is imparted with a wrap material output trajectory when discharged from the feed roll and rotation of the pivoting frame from the home position into the pivoted position rotates the wrap material output trajectory toward the feed opening.

13. The wrap material supply system of claim 12, wherein the wrap material output trajectory is shifted towards the feed opening when the pivoting frame rotates from the home position into the pivoted position.

14. The wrap material supply system of claim 13, further comprising a guide roll positioned adjacent and forming a nip with the feed roll;
wherein, when the pivoting fame resides in the pivoted position, a straight line extending from the nip in the direction of the wrap material output trajectory intersects the feed opening in the baler housing.

15. The wrap material supply system of claim 12, wherein the actuator comprises an output movable between a first end position, a second end position, and an intermediate position between the first end position and the second end position; and
wherein rotation of the pivoting frame about the first pivot point commences as the output of the actuator moves through intermediate position and toward the second end position.

16. The wrap material supply system of claim 15, further comprising a counter knife arm coupled between the output of the actuator and the pivoting frame;
wherein the counter knife arm rotates about a second pivot point as the output of the actuator moves from the first end position to the intermediate position.

* * * * *